United States Patent [19]

Forschirm et al.

[11] Patent Number: 4,942,208

[45] Date of Patent: Jul. 17, 1990

[54] POLYACETAL LIGHTER BODY RESIN

[75] Inventors: Alex S. Forschirm, Parsippany; Jon H. Davies, Chatham, both of N.J.

[73] Assignee: Hoechst Celanese Corporation, Somerville, N.J.

[21] Appl. No.: 241,389

[22] Filed: Sep. 7, 1988

Related U.S. Application Data

[63] Continuation-in-part of Ser. No. 878,919, Jun. 26, 1986, abandoned.

[51] Int. Cl.$^5$ .................. C08L 59/00; C08L 61/00; F23Q 2/02
[52] U.S. Cl. .................. 525/414; 525/398; 525/410; 264/237; 431/130
[58] Field of Search .................. 525/414, 410

[56] References Cited

U.S. PATENT DOCUMENTS 4,070,415  1/1978  Sextro et al. .................. 525/414

Primary Examiner—John C. Bleutge
Assistant Examiner—Vasu S. Jagannathan
Attorney, Agent, or Firm—Depaoli & O'Brien

[57] ABSTRACT

A novel polyacetal resin blend provides for dimensionally stable rib-reinforced tubular bodies upon injection molding of the blend. The blend comprises a major proportion of an oxymethylene copolymer having a melt index of 27.0 grams/10 minutes and a minor proportion of an oxymethylene copolymer having a melt index of 9.0 grams/10 minutes to provide hydrolytic stability to the molded article. Each of the oxymethylene copolymers are formed from recurring oxymethylene units interspersed with alkylene oxide units in which the alkylene group contains at least two adjacent carbon atoms. The blend is particularly useful in forming cigarette lighter bodies.

15 Claims, 1 Drawing Sheet

POLYACETAL LIGHTER BODY RESIN

This application is a continuation-in-part of U.S. Ser. No. 878,919, filed June 26, 1986, now abandoned.

BACKGROUND OF THE INVENTION

1. Field of the Invention

This invention relates to a novel polyacetal resin blend useful in the injection molding of hollow tubular structures such as cigarette lighter bodies. The present invention is also concerned with a process for forming dimensionally stable hollow tubular bodies by injection molding a novel oxymethylene polymeric blend comprising oxymethylene polymers of differing melt index.

2. Description of the Prior Art

Oxymethylene polymers having recurring —CH$_2$O— units, have been known for many years. These polymers may be prepared by the polymerization of anhydrous formaldehyde or by the polymerization of trioxane, which is a cyclic trimer of formaldehyde.

Oxymethylene polymers of exceptional toughness and high molecular weight may be prepared by polymerizing trioxane in the presence of a cationic catalyst such as boron fluoride-containing catalysts, including boron fluoride, itself and boron fluoride coordination complexes with organic compounds in which oxygen or sulfur is the donor atom.

The usefulness of oxymethylene polymers in molding compositions is well known. Oxymethylene polymers are distinguished by a number of excellent properties so they are suitable for a variety of industrial applications. Many of the desirable properties of oxymethylene polymers result from the fact that these polymers are highly crystalline. However, microscopic examination of thin sections of such polymers also shows that there is a non-homogeneous coarse spherulitic structure which when forming during solidification of a melt, produces different shrinkage values, distortions, and internal stresses, which lead to variations in the dimensions of molded articles manufactured therefrom. Accordingly, it is well known to incorporate nucleating agents into oxymethylene polymer compositions to control and render the crystallization of the oxymethylene polymer more uniform. Many nucleating agents are known in the art. U.S. Pat. No. 3,775,363 which is just illustrative of such art discloses acicular calcium metasilicate as a nucleating agent for oxymethylene molding resin.

One commercial application of oxymethylene polymers is in the mass production of cigarette lighter bodies. Cigarette lighter bodies are hollow cylinders of circular or elliptical cross-section which contain a reinforcing rib positioned along the diameter of the base. The lighter bodies serve as the supply for the lighter fluid and as the support for the flame-forming mechanism. The cigarette lighter bodies are manufactured by injection molding the rib-reinforced lighter bodies from the oxymethylene polymer in one piece. To mass produce such articles, the lighter bodies are ejected from the mold prior to being completely hardened. The lighter bodies, thus, are cooled and completely hardened outside the mold. Upon cooling, a separate base plug is inserted into the end of the lighter body and sonic welded thereto. It can be readily seen that in mass producing such cigarette lighter bodies from oxymethylene polymers by injection molding, it is necessary that the oxymethylene polymer chosen continuously yield lighter bodies of uniform base dimensions to insure that the base plug can be snugly fit into the end of the lighter body on a mass production scale. Avoiding variations in the dimensions of the molded ligher bodies is critical if mass production is to be maintained with a minimum of waste.

Although dimensionally stable cigarette ligher bodies have been mass produced by injection molding oxymethylene homopolymer, it has been found more difficult to produce cigarette lighter bodies with uniform dimensions when injection molding oxymethylene copolymers on a mass scale. Oxymethylene copolymers as defined herein comprise a major proportion of oxymethylene units and a minor proportion of oxyalkylene units, in which the alkylene contains at least two carbon atoms, such as ethylene oxide. Thus, it has been found that when injection molding oxymethylene copolymers into cigarette lighter bodies, the dimensions of the tubular body often become distorted during the cooling and final hardening stage after the lighter bodies have been ejected from the mold. The distortion results from melt flow along the diametrically placed reinforcing rib prior to completion of hardening and crystallization of the polymeric lighter body. It has been unexpectedly found that relatively high molecular weight oxymethylene copolymers do not crystallize at a sufficient rate to avoid melt flow along the rib and consequent distortion of tubular diameter.

Accordingly, another physical property of oxymethylene polymers which must be considered in the manufacture of molded articles, including cigarette lighter bodies, is the ease of flow of such polymers. Thus, for some applications, it is desired to have polymers which flow readily at elevated temperatures while for other applications it is desired to have polymers which resist such flow. The melt index, which is related to molecular weight, provides an indication of the ease of flow of a polymer.

The melt index is determined by heating a sample of a polymer in a standard cylinder to a standard temperature of 190° C. and forcing it under a standard load of 2.160 kg. through a standard orifice of 0.0825 inch diameter and 0.315 inch long for a standard period and weighing the polymer passing through the orifice during this period. The results are recorded in grams per 10 minutes. The test is described in detail in ASTM D-1238-57T.

The melt index (10X) is generally used when melt index values are low and is determined in an identical manner except that the standard load is increased 10 fold to 21.60 kg.

It can readily be seen that in forming molded articles from oxymethylene polymers, a particular combination of physical properties of the oxymethylene polymer must be provided to meet the desired design specifications of the articles, whether to meet particular mechanical properties such as impact strength and the like and/or to provide dimensionally stable articles where avoiding variations in the dimensions of molded units is critical.

It is thus a primary object of the present invention to provide an oxymethylene copolymer molding composition having desired physical properties so as to be injection molded into cigarette lighter bodies which can meet strength requirements and critical dimension requirements.

It is another object of the invention to provide an oxymethylene copolymer molding composition which can be injection molded into cigarette lighter bodies of uniform dimension so that such lighter bodies can be mass produced.

SUMMARY OF THE INVENTION

It has now been discovered that the critical dimensional specifications of rib-reinforced tubular bodies can be met by injection molding an oxymethylene copolymer which has a melt index of 27.0 g/10 minutes. Thus, it has been found, quite unexpectedly, that this relatively low molecular weight oxymethylene copolymer readily crystallizes and that upon being ejected from the mold prior to complete hardening, the dimensions of a tubular body molded from the oxymethylene copolymer remain stable and are not distorted during the cooling stage by melt flow along the supporting rib. Thus, in accordance with the present invention, rib-reinforced tubular bodies such as cigarette bodies having circular or elliptical cross section can be mass produced by injection molding and meet the critical base diameter requirements needed for mass assembly.

It has been further discovered that by blending an oxymethylene copolymer having a melt index of 9.0 to the oxymethylene copolymer having a melt index of 27.0, the hydrolytic stability of the molded article is vastly improved over articles molded from the lower molecular weight copolymer alone and that dimensional stability of the rib-reinforced tubular articles can still be maintained after being ejected from the mold for cooling and hardening.

Further, small amounts of a nucleating agent can be included in the oxymethylene copolymer blend without detriment to obtaining dimensionally stable articles by the injection molding process wherein cooling and complete hardening take place outside the mold.

DETAILED DESCRIPTION OF THE INVENTION

Figure 1:
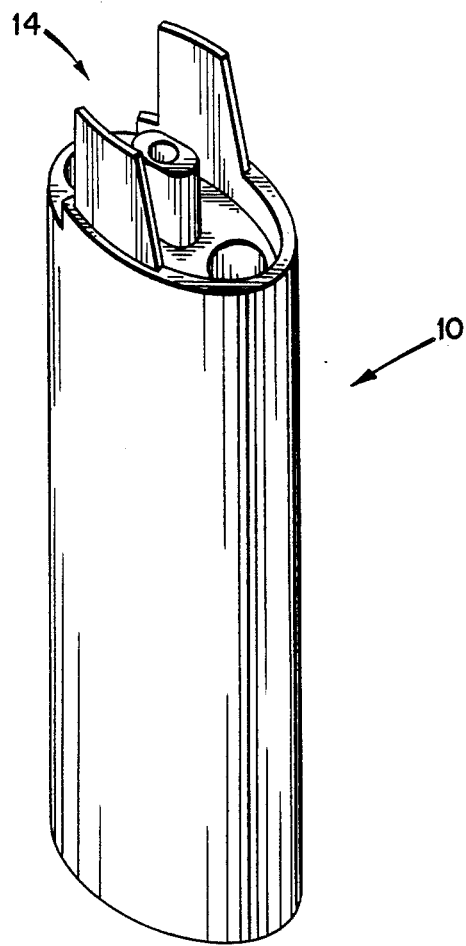

Oxymethylene polymers are well known in the art. The polymers are characterized as having recurring oxymethylene groups or units, i.e., —CH$_2$O—. The term oxymethylene polymer as used herein is intended to include any oxymethylene polymer having —CH$_2$O— groups comprising at least about 50 percent of the recurring units, for example, homopolymer, copolymers, terpolymers and the like.

Typically, the homopolymers are prepared by the polymerization of anhydrous formaldehyde or by the polymerization of trioxane which is a cyclic trimer of formaldehyde. For example, high molecular weight polyoxymethylenes have been prepared by polymerizing trioxane in the presence of certain fluoride catalysts such as antimony fluoride and may also be prepared in high yields and at rapid reaction rates by the use of catalysts comprising boron fluoride coordinate complexes with organic compounds. The homopolymers are usually stabilized against thermal degradation by end-capping or the incorporation therein of stabilizer compounds such as described in U.S. Pat. No. 3,133,896 to Dolce and Berardinelli.

Oxymethylene polymers that are particularly adapted for use in the molding compositions of the present invention are oxymethylene copolymers, which may be prepared as described in U.S. Pat. No. 3,027,352 of Walling et al by copolymerizing, for example, trioxane with any of various cyclic ethers having at least two adjacent carbon atoms, e.g., ethylene oxide, dioxolane, and the like.

Especially suitable oxymethylene copolymers which may be used in the molding compositions of the present invention usually possess a relatively high level of polymer crystallinity, i.e., about 70 to 80 percent. These preferred oxymethylene copolymers have repeating units which consist essentially of (a) —OCH$_2$— groups interspersed with (b) groups represented by the general formula:

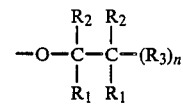

wherein each R$_1$ and R$_2$ is selected from the group consisting of hydrogen, lower alkyl and halogen-substituted lower alkyl radicals, each R$_3$ is selected from the group consisting of methylene, oxymethylene, lower alkyl and haloalkyl-substituted methylene, and lower alkyl and haloalkyl-substituted oxymethylene radicals, and n is an integer from zero to three inclusive.

Each lower alkyl radical preferably has from one to two carbon atoms, inclusive. The —OCH$_2$— units of (a) constitute from about 85 to about 99.9 percent of the recurring units of the copolymer. The units of (b) may be incorporated into the copolymer during the step of copolymerization to produce the copolymer by the opening of the ring of a cyclic ether having adjacent carbon atoms, i.e., by the breaking of an oxygen-to-carbon linkage.

Copolymers of the desired structure may be prepared by polymerizing trioxane together with from about 0.1 to about 15 mole percent of a cyclic ether having at least two adjacent carbon atoms, preferably in the presence of a catalyst such as a Lewis acid (e.g, BF$_3$, PF$_5$, and the like) or other acids (e.g., HClO$_4$, 1% H$_2$SO$_4$, and the like).

In general, the cyclic ethers employed in making the preferred oxymethylene copolymers are those represented by the general formula:

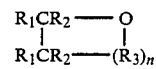

wherein each R$_1$ and R$_2$ is selected from the group consisting of hydrogen, lower alkyl and halogen-substituted lower alkyl radicals, and each R$_3$ is selected from the group consisting of methylene, oxymethylene, lower alkyl and haloalkyl-substituted methylene, and lower alkyl and haloalkyl-substituted oxymethylene radicals, and n is an integer from zero to three inclusive. Each lower alkyl radical preferably has from one to two carbon atoms, inclusive.

The preferred cyclic ethers used in the preparation of the preferred oxymethylene copolymers are ethylene oxide and 1,3-dioxolane, which may be represented by the formula:

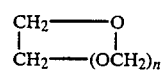

wherein n represents an integer from zero to two, inclusive. Other cyclic ethers that may be employed are 1,3-dioxane, trimethylene oxide, 1,2-propylene oxide, 1,2-butylene oxide, 1,3-butylene oxide and 2,2-di-(chloromethyl)-1,3-propylene oxide.

The preferred catalyst used in preparing the desired oxymethylene copolymers is the aforementioned boron trifluoride as discussed in the previously identified Walling et al patent. Reference is made to this patent for further information concerning the polymerization conditions, amount of catalyst employed, and the like.

The oxymethylene copolymers produced from the preferred cyclic ethers have a structure composed substantially of oxymethylene and oxyethylene groups in a ratio of from about 6 to 1 to about 1000 to 1.

The oxymethylene copolymers that are preferably present in the molding compositions of the present invention are thermoplastic materials having a melting point of at least 150° C., and normally are millable or processable at a temperature of from about 180° C. to about 200° C. They have a number average molecular weight of at least 10,000. The preferred oxymethylene copolymers have an inherent viscosity of at least 1.0 (measured at 60° C. in a 0.1 weight percent solution in p-chlorophenol containing 2 weight percent of alphapinene).

The oxymethylene copolymer component of the molding composition of this invention preferably is an oxymethylene copolymer that has been preliminarily stabilized to a substantial degree. Such stabilizing technique may take the form of stabilization by degradation of the molecular ends of the polymer chain to a point where a relatively stable carbon-to-carbon linkage exists at each end. For example, such degradation may be effected by either solution hydrolysis (hereinafter "SH") or melt hydrolysis (hereinafter "MH") to remove unstable groups. These processes degrade the hemiacetal end groups in the copolymer chain. Both processes are known to those skilled in the art and are in commercial practice. A useful solution hydrolysis process is described in U.S. Pat. No. 3,179,948 and a useful melt hydrolysis process is described in U.S. Pat. No. 3,318,848. If desired, the oxymethylene copolymer may be endcapped by techniques known to those skilled in the art. A preferred end-capping technique is accomplished by acetylation with acetic anhydride in the presence of sodium acetate catalyst. A preferred oxymethylene copolymer is commercially available from Hoechst Celanese Corporation under the designation CEL-CON ® acetal copolymer.

Oxymethylene terpolymers may also be used and are prepared, for example, by reacting trioxane and a cyclic ether and/or cyclic acetal such as in the preparation of the oxymethylene copolymer, with a third monomer which is a bifunctional compound such as a diglycide of the formula:

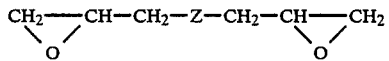

wherein Z represents a carbon-to-carbon bond, an oxygen atom, an oxy-alkoxy of 1 to 8 carbon atoms, preferably 2 to 4 carbon atoms, and which may be an oxycycloalkoxy of 4 to 8 carbon atoms, or an oxy-poly(lower alkoxy), preferably of 2 to 4 recurring groups each with 1 to 2 carbon atoms, for example, ethylene diglycide, diglycidyl ether and diethers of 2 mols of glycide and 1 mol of formaldehyde, dioxane or trioxane, or diethers of 2 mols of glycide and 1 mol of an aliphatic diol with 2 to 8 carbon atoms, advantageously 2 to 4 carbon atoms, or a cycloaliphatic diol with 4 to 8 carbon atoms.

Examples of suitable bifunctional compounds include the diglycidyl ethers of ethylene glycol, 1,4-butanediol, 1,3-butanediol, cyclobutane-1,3-diol, 1,2-propane-diol, cyclohexane-1, 4-diol and 2-dimethyl-4-dimethyl-cyclobutane1,3-diol, with butanediol diglycidyl ethers being most preferred.

Generally, in preparing the terpolymer of trioxane, cyclic ether and/or cyclic acetal and at least one bifunctional diglycide compound, a ratio of from 99.89 to 89.0 weight percent trioxane, 0.1 to 10 weight percent of the cyclic ether and/or cyclic acetal, and 0.01 to 1 weight percent of the bifunctional compound is preferred, with the percentage figures being based on the total weight of monomers used in forming the terpolymer. The terpolymers thus obtained are characterized as being essentially white and having a particularly good extrudability.

The polymerization of the terpolymer may be carried out according to known methods, that is in substance, solution or suspension, while using the above-mentioned quantitative proportions of the termonomers.

It is preferred to use as the molding resin of this invention the oxymethylene copolymer as described above. However, minor amounts of an oxymethylene terpolymer may be included in the composition as a nucleant. A preferred oxymethylene terpolymer for such purpose is commercially available from Hoechst Celanese Corporation under the designation U10, and is a butanediol diglycidyl ether/ethylene oxide/trioxane terpolymer containing about 0.05 weight percent, 2.0 weight percent, and 97.95 weight percent of each component, respectively.

The polyacetal molding composition of the present invention comprises a blend of oxymethylene copolymers as above described. One such copolymer has a melt index of 27.0 and the other has a melt index of 9.0. Preferably, the blend comprises from about 50 to 85 wt. % of the oxymethylene copolymer having a melt index of 27.0 and from about 15 to 50 wt. % of the oxymethylene copolymer which has a melt index of 9.0. More preferably, the blend comprises 80 wt. % of the oxymethylene copolymer which has a melt index of 27.0 and 20% by weight of the oxymethylene copolymer which has a melt index of 9.0.

It is within the ambit of the present invention to use oxymethylene copolymers that include, if desired, plasticizers, formaldehyde scavengers, mold lubricants, antioxidants, fillers, colorants, reinforcing agents, light stabilizers, pigments, other stabilizers, and the like, so long as such additives do not materially affect the desired properties including enhancement of impact strength of the resulting molding composition and the articles molded therefrom.

Suitable formaldehyde scavengers include cyanoguanidine, melamines, polyamides, amine-substituted triazines, amidines, ureas, hydroxyl salts of calcium, magnesium, and the like, salts of carboxylic acids, and metal oxides and hydroxides. Cyanoguanidine is the preferred formaldehyde scavenger. Suitable mold lubricants include alkylene bisstearamide, long-chain amides, waxes, oils, and polyether glycides. The preferred mold lubricant is commercially available from Glyco Chemical, Inc. under the designation Acrawax C and is alkylene bisstearamide. The preferred antioxidants are hindered bisphenols. Especially preferred is 1,6-hexamethylene bis-(3,5-di-t-butyl-4-hydroxyhydrocinnamate), commercially available from Ciba-Geigy Corp. under the designation Irganox 259.

Among the conventional additives which may also be included in the oxymethylene copolymer molding compositions considered useful in the manufacture of cigarette lighter bodies in accordance with the present invention are nucleating agents. The nucleating agents are typically added to provide uniform crystallization of oxymethylene polymers. Thus, in those instances in which a nucleant must be added to improve crystallinity and/or the physical properties of the molded article, the addition of nucleating agents in amounts of up to about 5.0 wt.% may be tolerated and still yield oxymethylene copolymer compositions which when injection molded into cigarette lighter bodies will meet the critical dimensional requirements. A preferred nucleant is an oxymethylene terpolymer as described above.

Figure 2:
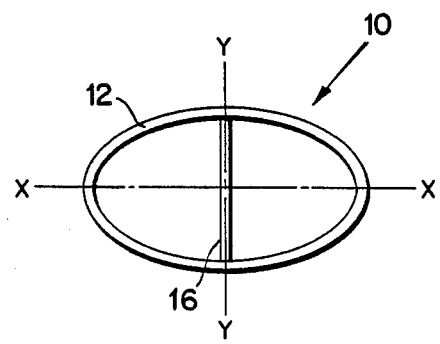

The novel oxymethylene copolymer blend of the present invention is useful in the manufacture of hollow tubular bodies which contain a reinforcing rib along the diameter thereof and wherein the rib-reinforced tubular body is injection molded in one piece and ejected from the mold prior to complete hardening of the body. What has been found, is that the rib-reinforced tubular bodies which are formed from the blend of the present invention are dimensionally stable, such that upon ejection of the article from the mold, the tubular diameter is maintained and will not distort during the cooling of the article. This is particularly important in the mass production of such tubular bodies wherein the cool-down time must be provided outside of the mold. The novel blend of the present invention is particularly useful in the production on a mass scale of cigarette lighter bodies. Also, the oxymethylene copolymer blend of this invention produces molded articles of enhanced hydrolytic stability. It is believed the oxymethylene copolymer of melt index 9.0 provides the improvement in hydrolytic stability which is found. The cigarette lighter body which is formed from the oxymethylene copolymer composition in accordance with the present invention is a hollow body of cylindrical shape having a circular, preferably, an elliptical cross section. Such a cigarette lighter body is depicted by reference numeral 10 in FIGS. 1 and 2. For those cigarette lighter bodies of elliptical cross section as shown in FIG. 2, the outside diameter of the base along the elongated or X-axis will be on the order of one inch whereas the outside diameter along the shortened or Y-axis will be on the order of 0.5 to 0.75 inch. Thickness of wall 12 will range from about 0.05 to 0.07 inch. The length of the cigarette lighter body 10 is on the order of about 3 inches. Reinforcing rib 16 placed diametrically across body 10 as shown in FIG. 2 is an integrally molded component of lighter body 10. The structure depicted by reference numeral 14 in FIG. 1 forms the support for the flame producing mechanism of the finished lighter and is also an integrally molded component of lighter body 10.

In a typical molding operation, the cigarette lighter body can be moled on an Ingersoll-Rand 300 ton, 32 ounce reciprocating screw injection molding machine. The machine is equipped with a 24 cavity mold fed by an insulated runner system. In operation, the resin pellets are fed into the machine through a hopper leading to the metering section of the screw, and are then conveyed down the heated barrel by means of rotation of the screw. When the plasticized resin reaches the front of the screw, it is injected into the mold under high pressure by the screw acting as a ram. In the mold, the oxymethylene polymer crystallizes and partially cools. The molded articles are ejected from the mold and stored where further cooling and crystallization occur. Typical molding conditions are a 20-22 second cycle time, a melt temperature of 250° –450° F., a mold cavity temperature of 100° –250° F. and an injection pressure of 5,000–25,000 psi.

EXAMPLE 1

Oxymethylene copolymer compositions of differing melt index (nucleated and non-nucleated) were prepared and injection molded into cigarette lighter bodies. Injection molding was done on an Ingersoll-Rand 300 ton, 32 ounce reciprocating screw injection molding machine. Molding conditions included a 20-22 second cycle time, a melt temperature of 380° F., a mold cavity temperature of 160° F. and an injection pressure of 16,000 psi. The compositions were tested to determine what percent of 50 lighters formed from the individual compositions would have a base diameter of at least 0.487 inch, I.D. The particular formulations and the results are set forth in Table 1.

As can be seen from Table 1, the oxymethylene copolymer compositions having a Melt Index=27.0, (Samples A and F) outperformed the comparable copolymer compositions relative to yielding the most stable product. Surprisingly, the addition of nucleants to oxymethylene compositions did not result in improvements in achieving dimensional requirements.

TABLE 1

| Ingredient | A | B | C | D | E | F | G | H | I | J | K | L | M |
|---|---|---|---|---|---|---|---|---|---|---|---|---|---|
| Celcon M90[1] | | | | 99.4 | 98.6 | | | | 94.1 | 95.8 | 95.8 | | |
| Celcon M140[2] | | 95.8 | 99.4 | | | | | 99.1 | | | | | |
| Celcon M270[3] | 95.8 | | | | | 99.4 | | | | | | | |
| Irganox 259 | .5 | .5 | .5 | .5 | .5 | .5 | .5 | .5 | .5 | .5 | .5 | | |
| Calcium Hydroxystearate | .1 | .1 | .1 | .1 | .1 | .1 | .1 | .1 | .1 | .1 | .1 | | |
| Arcrawax C | .3 | .3 | | | .3 | | .3 | .3 | .3 | .3 | .3 | | |
| Celcon U10-01[4] (nucleant) | 3.5 | 3.5 | | | .5 | | 99.1 | | .5 | 3.5 | 3.5 | | |
| Pigmented Delrin[5] | | | | | | | | | | | | 100 | |
| Natural Delrin[5] | | | | | | | | | | | | | 100 |
| % of 50 lighters tested having a base diameter | 18 | 0 | 17 | 48 | 0 | 78 | 59 | 0 | 0 | 4 | 4 | 66 | 42 |

TABLE 1-continued

| | Lighter Formulations, wt. % | | | | | | | | | | | | |
|---|---|---|---|---|---|---|---|---|---|---|---|---|---|
| Ingredient | A | B | C | D | E | F | G | H | I | J | K | L | M |
| of at least 0.487 in. | | | | | | | | | | | | | |

[1] oxymethylene copolymer; M.I. = 9.0
[2] oxymethylene copolymer; M.I. = 14.0
[3] oxymethylene copolymer; M.I. = 27.0
[4] branched oxymethylene terpolymer
[5] Dupont formaldehyde homopolymer; M.I. = 14

What is claimed is:

1. A molding composition comprising a blend of two oxymethylene copolymers, said blend comprising 50 to 85% by weight of an oxymethylene copolymer having a melt index of 27.0 grams/10 minutes and from about 15 to 50 wt. % of an oxymethylene copolymer having a melt index of 9.0 grams/10 minutes, each of said copolymers comprising a majority of recurring —OCH$_2$— groups interspersed with a minor amount of groups of the formula:

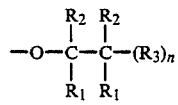

wherein each R$_1$ and R$_2$ is selected from the group consisting of hydrogen, lower alkyl and halogen-substituted lower alkyl radicals, each R$_3$ is selected from the group consisting of methylene, oxymethylene, lower alkyl and haloalkyl-substituted methylene, and lower alkyl and haloalkyl-substituted oxymethylene radicals, and n is an integer from zero to three inclusive.

2. The composition of claim 1 wherein each of said oxymethylene copolymers comprise from about 85 to 99.9 mol % of recurring oxymethylene units and from about 0.1 to 15 mol % of said interspersed groups.

3. The composition of claim 1 wherein each of said oxymethylene copolymers comprise about 98 mol % of recurring oxymethylene units and about 2 mol % of said interspersed groups.

4. The composition of claim 1 wherein each of said copolymers are formed by polymerizing trioxane with from about 0.1 to about 15 mol % of a cyclic ether of the general formula:

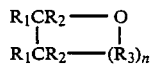

wherein each R$_1$ and R$_2$ is selected from the group consisting of hydrogen, lower alkyl and halogen-substituted lower alkyl radicals, and each R$_3$ is selected from the group consisting of methylene, oxymethylene, lower alkyl and haloalkyl-substituted methylene, and lower alkyl and haloalkyl-substituted oxymethylene radicals, and n is an integer from zero to three inclusive.

5. The composition of claim 4 wherein said cyclic ether is selected from ethylene oxide and 1,3-dioxolane.

6. The composition of claim 1 wherein said blend comprises about 80 wt. % of the oxymethylene copolymer which has a melt index of about 27.0 and about 20% by weight of said oxymethylene copolymer having a melt index of 9.0.

7. The composition of claim 1 comprising up to about 5.0 wt. % of a nucleating agent.

8. The composition of claim 7 wherein said nucleating agent is an oxymethylene terpolymer formed by polymerizing trioxane, a cyclic ether or cyclic acetal and a diglycide of the formula:

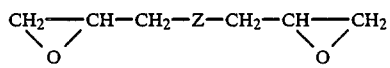

wherein Z represents a carbon-to-carbon bond, an oxygen atom, an oxy-alkoxy of 1 to 8 carbon atoms, an oxycycloalkoxy of 4 to 8 carbon atoms, or an oxy-poly(-lower alkoxy) of 2 to 4 recurring groups each with 1 to 2 carbon atoms.

9. The composition of claim 8 wherein said terpolymer comprises about 89.0 to 99.89 wt. % trioxane, 0.1 to 10 wt. % of said cyclic ether or cyclic acetal and 0.01 to 1 wt. % of said diglycide.

10. The composition of claim 9 wherein said terpolymer is formed by reacting trioxane, ethylene oxide and butanediol diglycidyl ether.

11. A molding composition comprising a blend of two oxymethylene copolymers, said blend comprising a major amount of an oxymethylene copolymer having a melt index of 27.0 grams/10 minutes and a minor amount of an oxymethylene copolymer having a melt index of 9.0 grams/10 minutes and sufficient to improve the hydrolytic stability of said blend/, each of said copolymers comprising from about 85 to 99.9 mol % of recurring —OCH$_2$— groups interspersed with 0.1 to 15 mol % of groups of the formula:

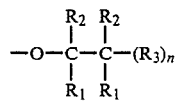

wherein each R$_1$ and R$_2$ is selected from the group consisting of hydrogen, lower alkyl and halogen-substituted lower alkyl radicals, each R$_3$ is selected from the group consisting of methylene, oxymethylene, lower alkyl and haloalkyl-substituted methylene, and lower alkyl and haloalkyl-substituted oxymethylene radicals, and n is an integer from zero to three inclusive.

12. The composition of claim 11 wherein each of said copolymers are formed by polymerizing trioxane with from about 0.1 to about 15 mol % of a cyclic ether of the general formula:

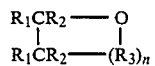

wherein each R$_1$ and R$_2$ is selected from the group consisting of hydrogen, lower alkyl and halogen-substituted lower alkyl radicals, and each R$_3$ is selected from the group consisting of methylene, oxymethylene, lower alkyl and haloalkyl-substituted methylene, and lower alkyl and haloalkyl-substituted oxymethylene radicals, and n is an integer from zero to three inclusive.

13. The composition of claim 12 wherein said cyclic ether is selected from ethylene oxide and 1,3-dioxolane.

14. The composition of claim 11 wherein said blend comprises about 80 wt. % of the oxymethylene copolymer which has a melt index of about 27.0 and about 20% by weight of said oxymethylene copolymer having a melt index of 9.0.

15. The composition of claim 11 comprising up to about 5.0 wt. % of a nucleating agent.

* * * * *